Sept. 18, 1956　　　T. O. HENRIKSON　　　2,763,133
REFRIGERATOR CARS HAVING ICE TANKS
Filed Oct. 4, 1954　　　　　　　　　　　6 Sheets-Sheet 1
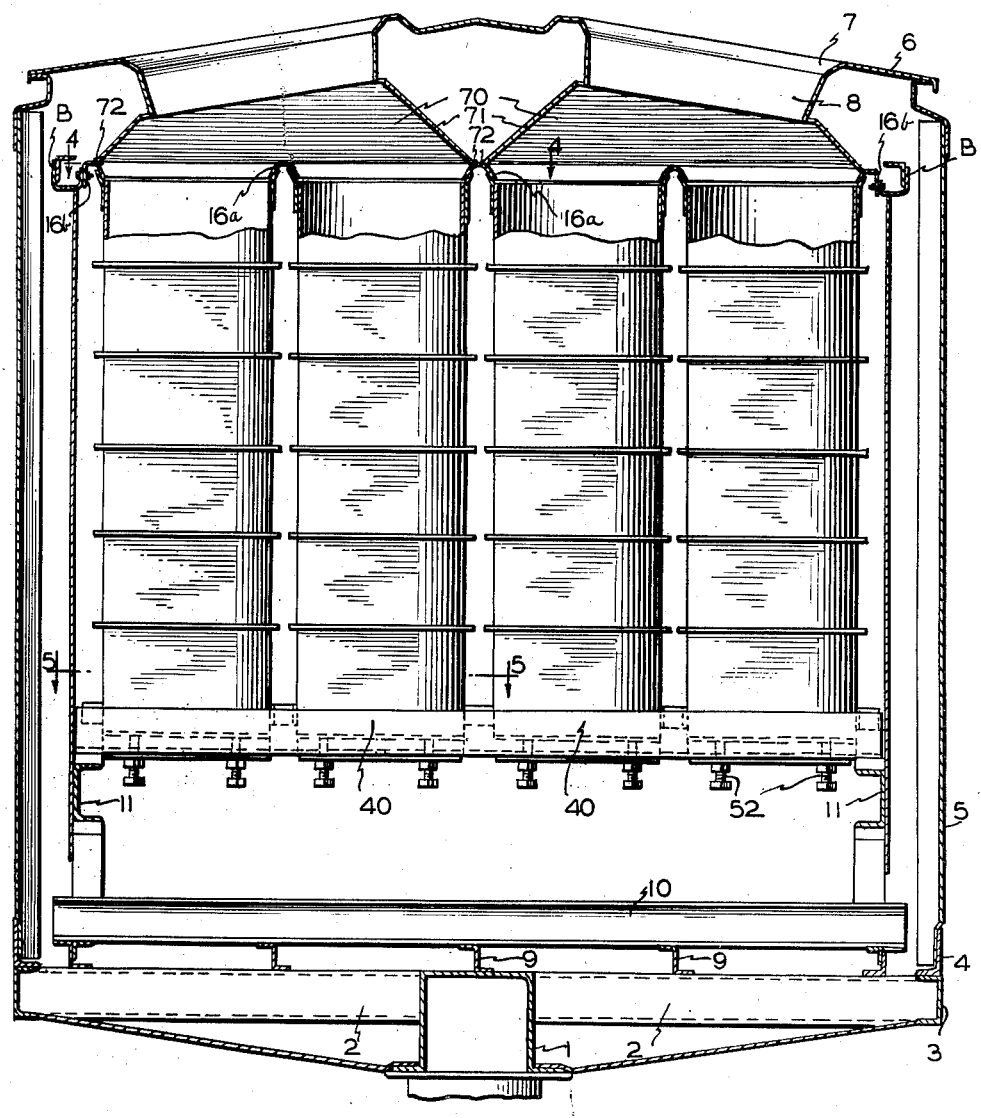
INVENTOR
THOR O. HENRIKSON
BY
ATTORNEY

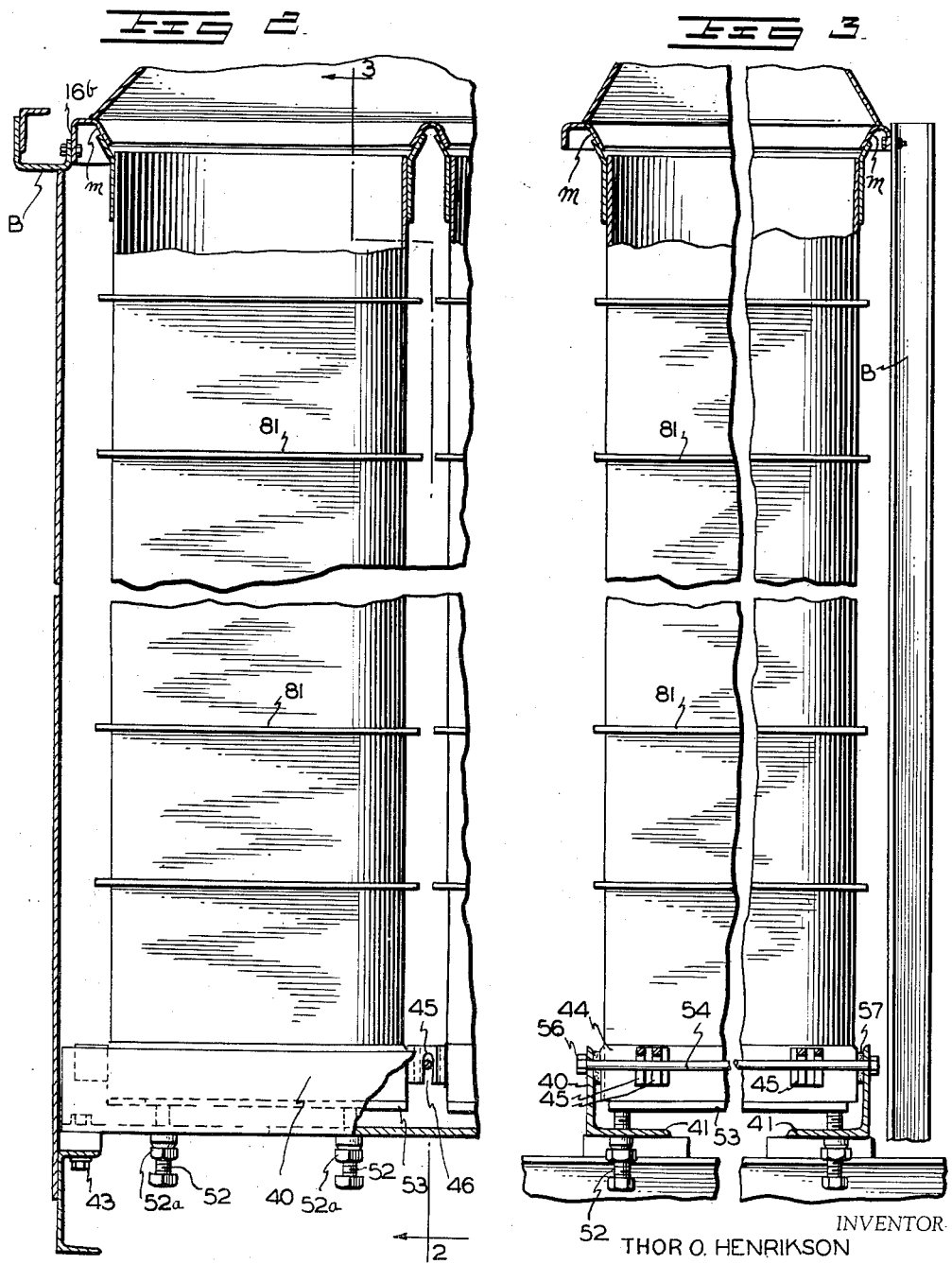

Sept. 18, 1956 T. O. HENRIKSON 2,763,133
REFRIGERATOR CARS HAVING ICE TANKS
Filed Oct. 4, 1954 6 Sheets-Sheet 3
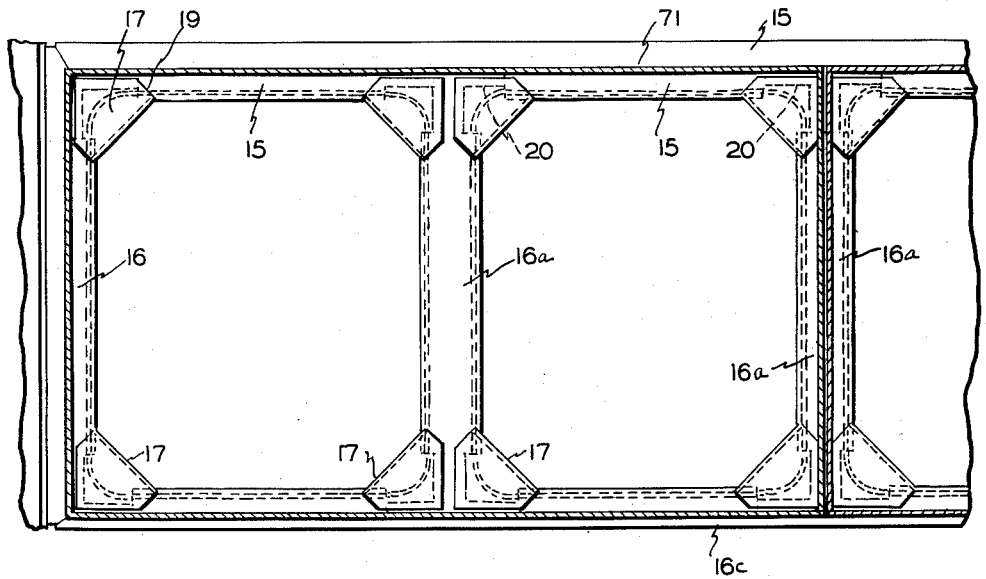
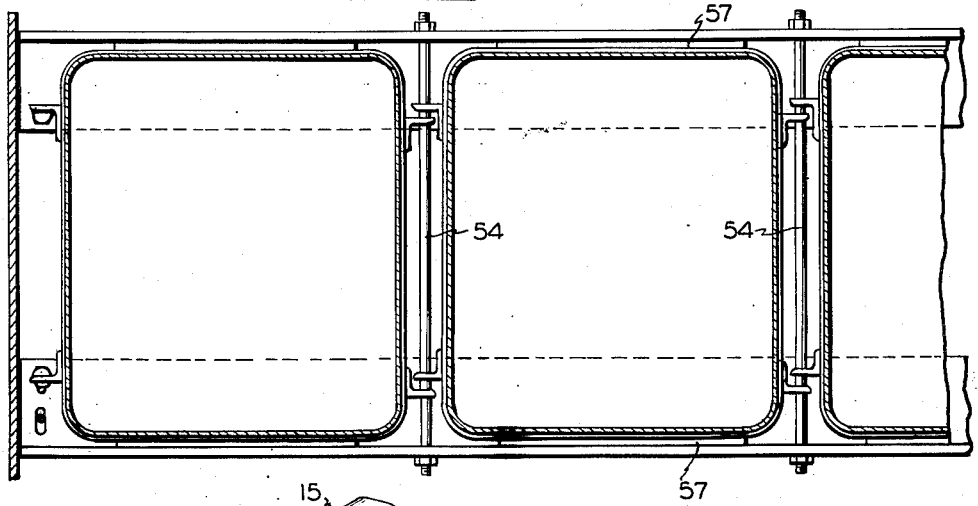
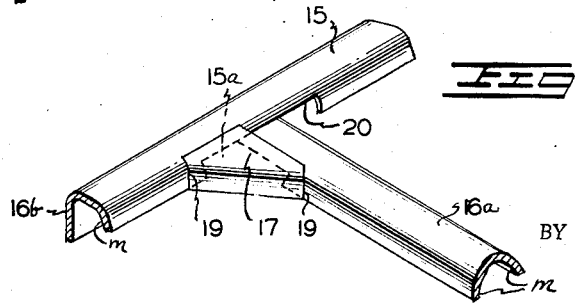
INVENTOR
THOR O. HENRIKSON
BY Ralph L. Bassett
ATTORNEY

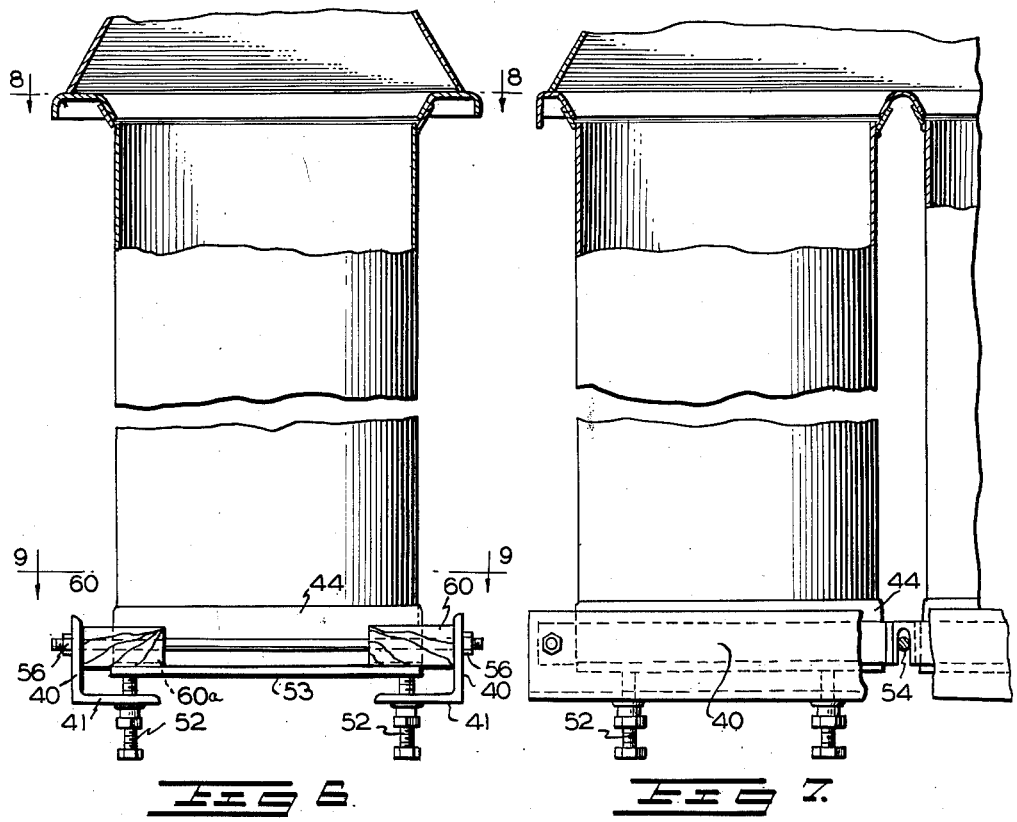
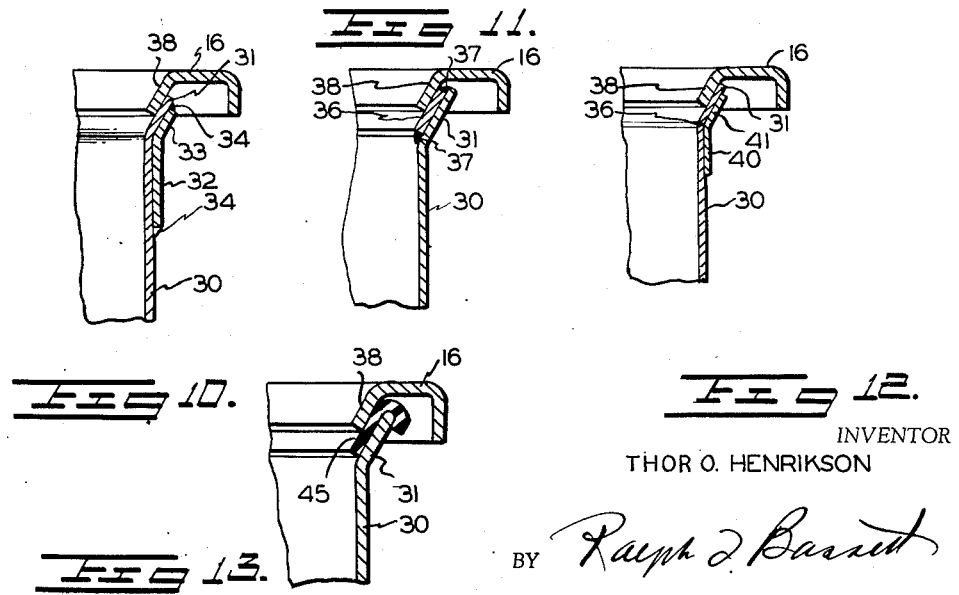

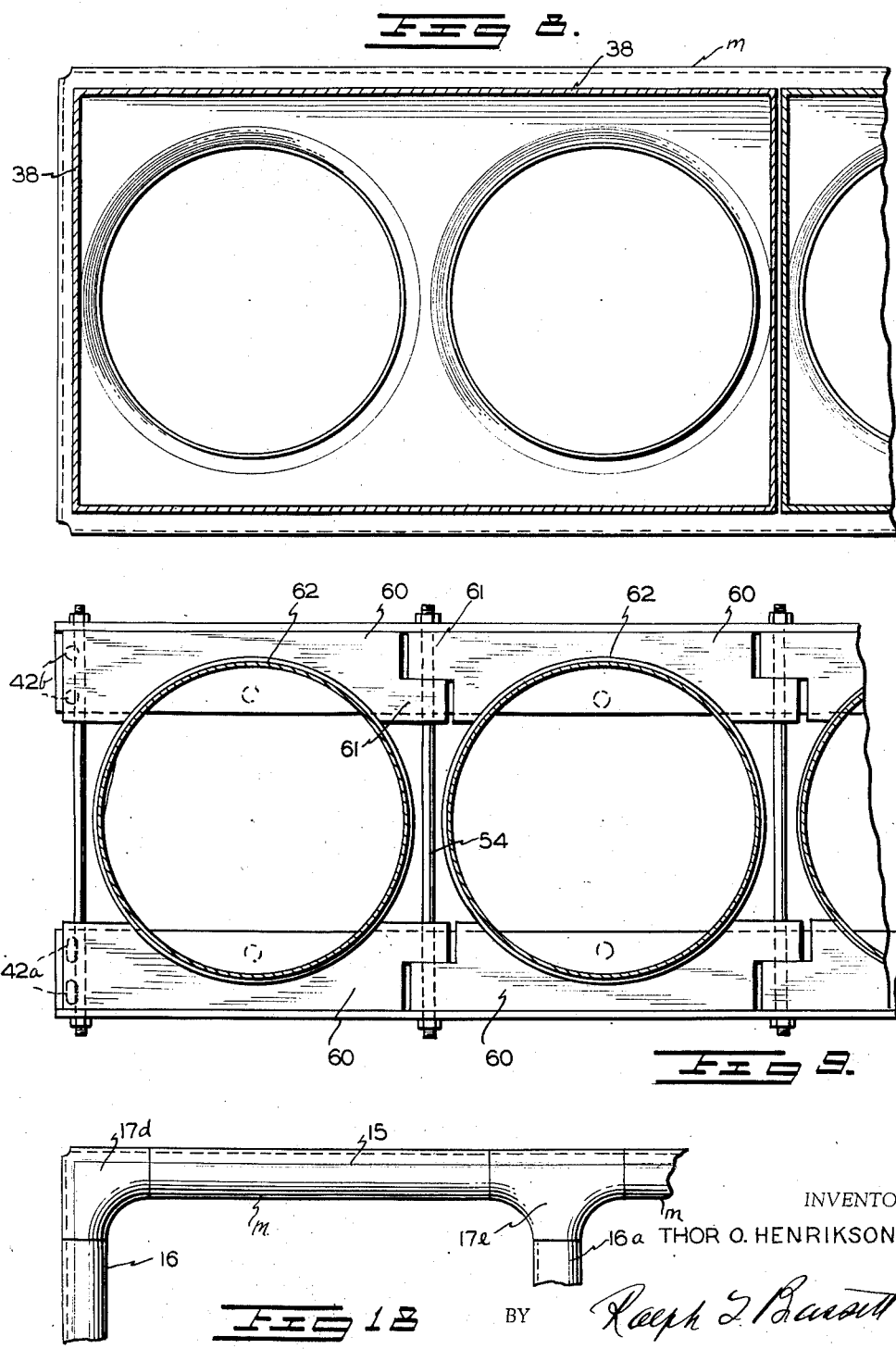

Sept. 18, 1956 T. O. HENRIKSON 2,763,133
REFRIGERATOR CARS HAVING ICE TANKS
Filed Oct. 4, 1954 6 Sheets-Sheet 6
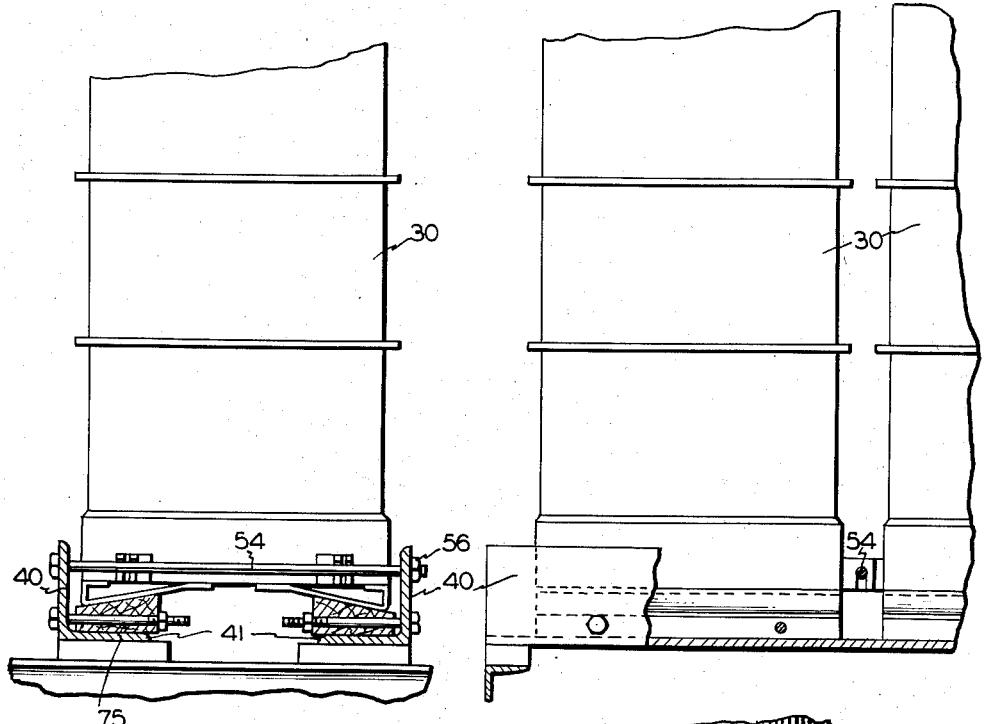
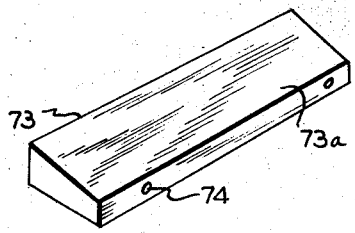
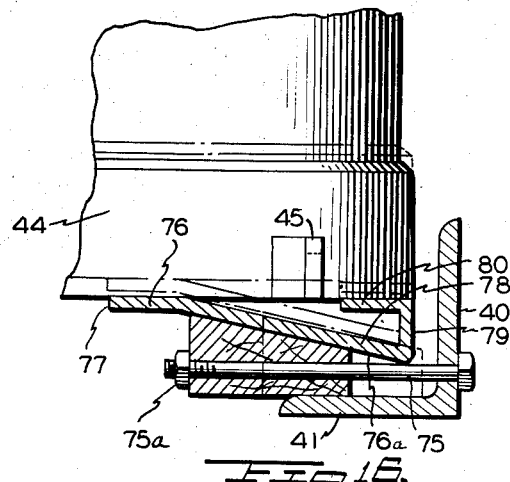
INVENTOR
THOR O. HENRIKSON
BY
ATTORNEY United States Patent Office 2,763,133
Patented Sept. 18, 1956

2,763,133

REFRIGERATOR CARS HAVING ICE TANKS

Thor O. Henrikson, Seattle, Wash., assignor to Pacific Car and Foundry Company, Renton, Wash.

Application October 4, 1954, Serial No. 460,136

21 Claims. (Cl. 62—19)

The main object of this invention is to improve refrigerator cars utilizing brine tanks and particularly improve the tank supporting structure.

Another object of this invention is to provide tapered seating for the individual brine tanks at their upper end structure and to incorporate with such upper tapered seating a base assembly facilitating the seating during assembly and use.

It is a further object of this invention to so mount the individual tanks and their assemblies that freedom of movement of the parts is avoided and the damage resulting from impact between cars is prevented.

This invention also provides a frame or mounting for the tanks of rigid structure particularly at the corner areas thus avoiding rupture of the frame or mounting under impact such as from buff or draft forces, it being remembered that the tank loads are substantial and thus under impact exert substantial forces.

More specifically, this invention includes the tapered seating of the tanks at their upper marginal portions and the use of hold-down clips and tie rods for securing the parts against movement when so seated, the hold-down mechanism providing variable adjustments to insure proper seating of the parts so as to avoid possible concentration of stresses at any one single area.

Other features will more clearly hereinafter appear by reference to the specification and drawings, the latter having similar reference characters designating corresponding parts throughout the several views, in which:

Fig. 1 is a cross section through a refrigerator car showing the upper portion of the brine tanks, the upper tank framing and the hoppers in section;

Fig. 2 is a fragmentary elevation, partly in section, showing the base mounting and top supporting structure, the latter being in section;

Fig. 3 is a section on line 3—3 of Fig. 2;

Fig. 4 is a sectional view on line 4—4 of Fig. 1;

Fig. 5 is a sectional view on line 5—5 of Fig. 1;

Fig. 6 is an end elevation of a cylindrical tank and its supporting structure, partly in section;

Fig. 7 is a front elevation partly in section of the tank of Fig. 6, showing the lower support used in connection with a round tank;

Fig. 8 is a section on line 8—8 of Fig. 6;

Fig. 9 is a section on line 9—9 of Fig. 6;

Figs. 10, 11, 12 and 13 are fragmentary sectional views illustrating modified forms of reinforced upper marginal tank portions;

Fig. 14 is a transverse sectional view showing a modified structure for jacking the tanks, including the use of beveled blocks and with the tank in fully elevated position;

Fig. 15 is a front elevation, partly in section, showing the invention of Fig. 14;

Fig. 16 is a transverse section of one of the wedges prior to the jacking of the tank with the adjusted position shown in dotted lines;

Fig. 17 is a perspective view of one of the wedges;

Fig. 18 is a fragmentary top plan view of the top frame structure modified at its connections; and Fig. 19 is a fragmentary perspective illustrating a frame joint structure of Fig. 4.

Referring to Fig. 1 it will be seen that the shell of a refrigerator car is illustrated in section including the underframe structure embodying a center sill 1, cross bearers 2, side sill structures 3 and side framing 4 to which is attached the usual side sheets 5. The roof framing is not illustrated in Fig. 1, however, the roof sheets 6 are shown about that area defining the hatch openings 7, the latter projecting inwardly in the usual manner to define the hatch wall structures 8 which converge downwardly and towards the center of the car and are gradually tapered towards their lower edge portions. The specific framing and structure of the car is not important, the parts being illustrated generally to show the relationship between the parts of a boxcar assembly and the elements forming the present embodiment. The car wall structure and the particular form of insulation and screening form no part of the present embodiment. Likewise, the main base of the supporting structure for the brine tanks may be of any suitable form, the present disclosure including the longitudinally extending Z-sills 9 and the transverse I-beams 10 supported thereon. It is the intention that as much clearance be provided beneath the tank structure as possible and that the tanks be positioned so as to provide suitable space for assembly, adjustment and repair and for connection with suitable drain equipment. In the present illustration, the tanks are shown as supported from channels 11 extending longitudinally of the car and supported by suitable means on the cross I-beams 10.

Considerable difficulty has been experienced in the supporting of brine tanks, these tanks under normal working conditions being under substantial load and being subjected to forces prevalent in railroading which would tend to rupture the present-day supporting frame either at the top or bottom, or injure the tanks because of stresses and strains applied to the tank because of their shifting under impact or distortion due to relative weaving between the tank and the supporting structure either at the top or bottom of the assembly. Further, in present assemblies substantial blocking is required between the frame and tank, this blocking deteriorating quickly and likewise being subject to displacement due to shifting of related parts.

For instance, in the prior art it has been conventional to use structural members such as angle irons or the like to provide a framing for the tank and to block the tank with wooden inserts or fillers or other available material to retain the same in adjusted position. In the present invention the tanks, regardless of their cross-sectional shape, are provided with flared upper extremities, these flared upper extremities being provided for the purpose of producing a wedge-fit with the specially constructed upper associated frame structure. Fig. 4 shows the one form of upper frame structure, this figure being taken on line 4—4 of Fig. 1. As shown, this upper frame structure is formed with a plurality of tank openings defined by spaced side frame members 15 of inverted U-form and a plurality of spaced transverse members 16 and 16ᵃ connecting the side frame members 15 at their ends and at predetermined intermediate points, respectively, to define upper tank braces for receiving the upper tank structures.

In the present illustration there are four tanks provided, a pair of tanks being arranged at each side of the longitudinal center line of the car and each pair of tanks fed from hatch openings in the usual manner through hopper structures hereinafter described. The corner angle braces 17 are shaped as shown at 19 to fit angular faces of 15 and 16ª and project to lie on top of these members to compensate for the removal of cuts 15ª and 20. Angle braces 17 are welded to the main bembers to provide an integrated structure. To provide for the reception of the brine tanks, faces of frame members 15 and 16ª are cut away at their joints of intersection as shown at 15ª and 20. At the junction of the intermediate cross members 16ª it will be seen by reference to Fig. 4 that these members connect with the side frame members 15 and are cut away at 20 for the reception of the corner of the brine tank. At the junctions of the intermediate cross element members 16ª the side frame members and the cross members are notched to the same degree as at the corners to provide for the clearance of the brine tanks.

It will be noted that at the intermediate points of connection of the cross braces with the side frame elements, two corner braces are used and arranged diametrically to furnish maximum strength in all directions and to provide against flexing of the structure in any direction. The side walls of each of the corner plate fit against the depending flange m of the frame members and the other parts of the plates lie on top of the frame members and these parts are welded throughout all contacting areas. In connection with this upper supporting frame it will be noted that the end frame members 16 have their outer flanges 16ᵇ substantially vertical for bolted connection with adjacent car framing indicated generally by reference character B. In this manner a rigid frame is provided in which all of the internal skirts M of the frame elements lie at a uniform inclined plane, as best shown in Figs. 2 and 3, for the reception of the flared-up faces of the tanks. It will be noted that the intermediate transverse frame elements 16ª have both of their depending arms oppositely flared to accommodate different tanks.

It will be obvious to one skilled in the art that the framing structure does not necessarily have to be of heavy material, but can be of suitable stock to provide a certain amount of inherent flexing to facilitate the gripping between the upper flared margin of the tank and the frame, and at the same time support its load. In this connection reference will be had to Figs. 10, 11, 12 and 13 in which modifications are shown of suitable tank structures for telescopic connection with the frame of Fig. 4. In these figures the upper flared margins of the tanks are modified but accomplish the same result when utilized with the novel framing. It will be apparent that the cross sectional shape of the tank structure in no way limits the utilization of the invention which comprehends a firm seating between the upper end of the tank body and the upper frame with sufficient inherent gripping and sufficient snugness to prevent displacement, rattling or vibration.

The seating of the flared upper extremities of the tank with the frame is brought about by means incorporated in the base support for the tank assembly which will be further hereinafter described.

Referring now to Fig. 10 it will be seen that the tank wall 30 is flared outwardly as at 31 entirely around its upper peripheral edge and this area is reinforced by a heavier metal belt 32 which embraces the tank below its flare 31 and is itself flared as at 33. The reinforcing belt or band 32 can be welded at both its upper and lower edges 34 as shown. In Fig. 10 as well as in the other figures, the section illustrates the connection of the flared upper marginal edge of the tank with the outer cross member 16 as it is in this form that the outer leg 16ᵇ of the inverted outer member 16 is substantially vertical.

In Fig. 11 the tank wall 30 is shown flared at its upper marginal edge 31 and a reinforcing belt or plate structure 36 is welded as at 37 to the inner or upper face of the flared marginal edge 31 of the tank. This will place the reinforcing plates or belts 36 in direct engagement with the adjacent angular face 38 of the frame member 16 and any wear which might possibly occur due to sliding of the faces will be taken up by the heavier belt structure 36 thereby avoiding weakening of the tank at its neck.

In Fig. 12 the tank 30 has its flared upper marginal edge portion 31 made separately and welded in position as at 39 and the reinforcing or backing belt or plate structure is formed of two separate parts 40 and 41, the former reinforcing belt or plate being about the upper marginal edge of the tank wall 30 and the latter about the separately formed flared extension 31. In some instances it may be advisable to provide a cushioning material between the flared upper extremity 31 of the tank 30 and the inner angular flange 38 of the frame. Fig. 13 shows the provision of a gasket interposed between these parts which may act as a cushion or compressible wear strip and if formed of suitable frictional elastic material will tend to permanently seal the connection between these two parts. It is proposed in the modification of Fig. 13 that the cushion or packing element 45 may be formed of reinforced elastic material or webbing or of suitable artificial rubber or analogous synthetic material which will function to produce the desired results. A packing or cushion such as shown at 45 may be used in the structures of Figs. 10, 11 and 12.

In Fig. 18 there is disclosed a modified form of an upper frame support. In this form the inverted U-shaped side members 15 and transverse members 16, 16ª are connected at points of intersection by means of channeled L-shaped connecting elements 17ᵈ at the end corners and channeled Y's 17ᵉ at the intermediate points. The channel sections of this frame shown in Fig. 18 are welded to the channeled L's and Y elements 17ᵈ and 17ᵉ at their point of contact to form a unitary structure providing framing having converging tapered inner wall portions m, which tapered converging inner wall portions m seat within the flared upper extremities 31 of the tank structure. It will be understood that the framing may be shaped to provide for receiving tanks of any cross section, the framing illustrated in Figs. 4 and 16 being designed to receive the tanks of square cross section as in Fig. 5. In assembly, a tank of desirable size, shape and cross section with a suitably constructed upper supporting frame embodying the invention of Figs. 4 and 16 is inserted in position with the upper flaring flange of the tank of any of the forms shown inserted in position so that the flared upper portion of the tank 31 firmly seats against the inner flange faces m of the upper frame, as shown in Figs. 1, 2 and 3, and is securely positioned by a jacking operation, the mechanism for which is embodied in the tank base support shown in detail in Figs. 1 to 3 and 14 to 16, inclusive.

As will be obvious, the brine tanks may be of different form or shape and in the present disclosure two types of tanks are illustrated, the square tank in Figs. 1, 2, 3, 4 and 5 and the round tanks are shown in Figs. 6, 7, 8 and 9. The main difference in the supporting structure between the tanks of circular cross section and the tanks of substantially square cross-section is the use of filler block 60 hereinafter more fully described. In all of the forms of the invention the tank base supporting structure includes two transversely aligned inwardly and upwardly facing angle members, each including a vertical flange 40 and a horizontal flange 41. These two angle members are secured at their extremities to the car framing as by means of suitable bolts 43, so that at least one of these angle members is retained in rigid fixed position and the other by virtue of slots 42ª, Fig. 9, can be adjusted in the direction of the length of the car for purposes hereinafter described. One of the angle members is shown with circular openings 42ᵇ, it being intended in the present illustration that this angle member be the fixed member and the opposing angle member having the elongated slot 42ª be the adjustable member.

Referring now to Fig. 3, it will be seen that the base of each of the tanks is reinforced by a band 44, the band 44 being provided at opposite sides with spaced pairs of outwardly projecting ears 45 formed with aligned openings 46. A pair of these spaced ears are provided at each lateral side of the tank with the openings 46 duly aligned for the reception of the elongated bolts 54, these bolts 54 extending through the upright vertical flanges 40 of the supporting angles and through the aligned slots or openings 46 in the ears 45 carried by the straps 44 at the base of the tank. The extremities of the bolts 54 are threaded for the reception of nuts 56 which, upon being tightened at each end of the bolt as best shown in Fig. 5, clamp the tank bases between the upright flanges 40 of the angle supports. It will be obvious that such bolts 54 could have a fixed head at one end with the adjusting nut opposing the adjustable main angle support as provided for by the slots 42$^a$ heretofore described. The tightening of the nuts 56 will slide this adjustable angle member into snug engagement with the tank and to cushion the adjustment and to deaden vibration fibrous inserts 57 may be located between the tank and the adjacent flange and facilitate seating of the structure.

For adjusting the tanks vertically and for seating the upper flared marginal edges of the tanks against the tapered faces of the upper frame, jack screws 52 are provided, these jack screws being threaded through the base flanges 41 at spaced intervals and having their upper extremities in engagement with heavy supporting plates 53 against which the jack screws work. These plates 53 may be fixed as by welding to the bottom of the tanks or may be separate structures as deemed advisable in the various installations. In the present illustration, a pair of jack screws are shown at each side of each individual tank, the screws being provided with lock nuts 52$^a$ to prevent turning of the jack screws due to vibration after the tanks have been elevated by clockwise rotation of the screws against the plates 53 to a point jamming the flared upper margin of the tanks against the upper framing as heretofore described.

Normally the tanks will be located immediately beneath their respective upper framing elements and substantially in alignment with the framing element so that upon operation of the jack screws, the tanks will be self-centered and locked into position. After centering the tanks, the screws will be tightened until there is a fixed relation between the base support and the top support of the tank. After the tanks are firmly seated against their framing at the upper flared end, then jack screws are locked by lock nuts 52$^a$ and the screws 56 at the ends of the bolts 54 are tightened to cause the heavy base flanges 44 to be clamped between the upright portion 40 of the angles. Packing 57 may be utilized between the inner faces of the upright 40 and the tank reinforcing flange 44 or in lieu thereof filler blocks such as shown in Figs. 6, 7 and 9 may be utilized. The filler blocks are best shown in Fig. 9 and may be shaped for nesting engagement with tanks of circular or oval cross section. In the present illustration the tanks are shown of circular form and the filler blocks therefor have overlapping projecting ears 61 formed with aligned openings for the reception of the bolts 54. In the disclosure of Fig. 9 the tanks are shown without the ears 45, but such ears can be used with the filler blocks if desired. The filler blocks are preferably made of wood or suitable plastic and are provided with concave areas 62 having a contour for engaging the contour of the tanks at the points of contact.

Obviously the transverse and lateral displacement of the tank at its base is further prevented by the concave surface 62 of the filler blocks 60 so that any tank placed in position and clamped by means of the clamp nuts 56 on the bolts 54 will be firmly engaged against longitudinal and transverse movement at its base and will be supported upon the flanges 41 of the angle frame and adjusted into position at its upper end against the outer face of the flared wall $m$ of the upper frame. The assembly using the filler blocks 60 is best illustrated in Figs. 6 and 7 and in these figures the use of the jack screws 52 for jacking the tank against the tapered flange of the upper frame will be obvious. As previously suggested, the number of jack screws may vary, however, the minimum limit will normally be used and this will be determined by the weight of the load which is to be supported by the structure.

Referring to Figs. 1, 2 and 3, the hopper structure is clearly shown for directing the feeding of ice from the hatches 7—8 to the brine tanks. These hoppers are constructed to include transverse walls 70, i. e. walls extending transversely of the car, and side walls 71. These walls throughout their lower marginal edges being welded to the top of the inverted U-channels forming the upper frame member, as indicated at 72, the point of connection being preferably at the top edge of the inner flange $m$ which in operating condition telescopically receives the flared upper marginal edges 31 of the tanks as clearly shown in Figs. 2 and 3. The hoppers are normally formed to care for pairs of tanks arranged at each side of the longitudinal center of the car and are, therefore, made in elongated form to span the pair of tanks as shown in Fig. 1. By having the hopper walls welded to the top of the flared wall $m$ of the upper frame, the deflection of the ice to the tanks is substantially facilitated. The hopper structures are generally in the form of truncated cones, with the top of the cone structure sheared generally at the plane of the adjacent roof section so that the throats 8 of the hatchways project into the hopers and there is no leakage in the loading of the tanks. As a result of this structure all of the associated parts of the assembly function as a unit to provide for convenient assembly, close seating and cooperation of the parts through readily accessible means in the form of jack screws at the base of the assembly.

In Figs. 14–17, inclusive, a modified tank supporting and jacking structure is shown which is suitable for use regardless of the cross-section of the tank and is particularly desirable because the adjusting means is located in a manner more available in facilitating the installation. In this modification, a series of wedge blocks 73 are utilized, these wedge blocks being provided with transverse openings 74 for the passage of bolts 75. The wedge blocks 73 are adapted to have their flat face seated on the lower horizontal flanges 41 of the supporting angles and are shiftable on this flange by means of the bolts 75 towards and away from the upright flanges 40 of the supporting angles. The wedge blocks 73 cooperate with base angles 76 which are arranged at the forward and aft sides of the tanks and have their angular faces 76$^a$ lying in a plane corresponding to the angular face 73$^a$ of the wedge blocks 73. These base angles may be of any width but are constructed of relatively heavy metal sufficient to support the weight of the load within the tanks. Each of the base angle plates 76 are formed of an inner flat portion 77, the medial downwardly and outwardly inclined portion 78, the end upright portion 79 and the inturned end portion 80. The end portions 79 and 80 are preferably welded into position against the base of the tank so that these angle plates are rigidly held with respect to the tank body. It will be noted that the base of the tank, as in the previous developments heretofore described, includes the reinforcing flange 44 and the slotted lugs or projections 45 which cooperate with the adjusting bolts 54 which extend between the upright flanges 40 of the main angle supports.

In the use of this modified construction, the tank angle plates 76 are initially placed upon wedge blocks 73 when the latter are in the position shown in Fig. 16. Then by tightening the bolts 75 through nuts 75$^a$ the tanks are elevated and clamped with their upwardly flared edges in snug seating engagement with the upper frames. When so seated the parts will be in the relative position shown in Fig. 16 in dotted lines and when in this position the tie bolts 54 are tightened by adjustment of the nuts 56 to move the angle supports closer together so as to engage the adjacent reinforcing bands 44 at the base of the tank. As in previous forms the packing 57 may be used, or the chock blocks 60 according to the shape of the tank and the requirements of such shape. It will be obvious to one skilled in the art that the wedge blocks 73 may extend the full length of the supporting angle flanges 40—41 or as in the disclosure of Fig. 17, individual wedge blocks may be provided, i. e. two for each tank, and the adjustment of the tanks may be made separately. Normally this may be the better course as it permits individual tightening of the tanks which may be required from time to time, although due to the upper flared ends of the tank and the clamping action between this flared upper extremity and the upper frame, such adjustments will be negligible.

Applicant's broad concept obviously is the close association and cooperation between the hatch, hopper and upper tank supporting frame, with the latter designed to receive the tapered or outwardly flared face of the tank thereby securing the parts together and assisting in structurally maintaining the frame against distortion due to buff and draft normally present in railroading. This structure also eliminates the present unsatisfactory method requiring extensive blocking between the tanks and between the tanks and the frame and car body. In addition to the foregoing, the present invention embodies the novel inverted U-shaped or inverted channel form of top framing. The shape of the frame with its integral outer and inner flanges and the added corner connections provides an exceedingly rigid structure. The specific cross-section of the framing can be modified, but in each instance it is essential that the framing include the inner tapered channel wall shaped and arranged to receive the flared upper end portion 31 of the tank.

In addition, applicant's concept embodies the built-in means for holding the tank, this structure embodying adjustments and permitting jacking or wedging of the tanks to seat the upper frame and the upper marginal edges of the tanks. The lower built-in holding devices eliminate the present blocking methods which have proven unsatisfactory in many instances and subject to a maximum amount of repair and replacement.

Tie rods passing through slots 46 in the clips 45 permit the adjustment of the tank in the jacking of the tank into position. The same theory of operation is obviously present in connection with the filler blocks 60 and in which the tie rods 54 extend through the holes 60ª in the filler blocks, permitting vertical movement of the tank within the blocks. In both of the assemblies, i. e. the assembly for the square tank and the cylindrical tank, the same structural features are involved and the same method of assembly of the tanks, the tanks being seated in both instances by the use of the built-in mechanical means shown, claimed and described. It will be obvious that it comes within the scope of the present invention to provide any suitable modified flared form at the top of the tank, some of the forms shown being modified and designed to avoid movement of the tank structures and also to avoid the present metal-to-metal contact. The modifications embodying this feature of the invention are illustrated in Figs. 10 to 13, inclusive.

The tanks may embody fins 81 which may be formed integral with the tanks and arranged in the most effective manner to produce the desired result. Such fins will definitely reinforce the tank body structure and avoid the breakage which is now experienced, due largely to the flexing of the tank sides under impact loading. The proposed fins 81 will prevent the flexing of the sides and consequent failures in the metal and will also aid in the transfer of heat. In this connection the arrangement of the fins will be varied to provide for maximum heat transfer. These fins may be made in complete rings or in halves or in quarters, and then welded to the tank. They may be tack welded to the tank body as the voids between welds would be filled with material to provide complete metal-to-metal contact when the tanks are being galvanized after the fabrication has been completed. While the use of the fins is obviously an optional feature as it is possible to make the tanks of sufficiently heavy material to withstand the loads to which the tanks are subjected, on the other hand a tank of lighter material would be easier to form and handle and could be used to advantage with fins for the additional function of aiding the transfer of heat.

The form of the tank, i. e. the cross-section of the tanks, whether round, square or otherwise, is a matter of choice, the round tank having many advantages from a manufacturing standpoint. While the round tank has less volumetric capacity and does not lend itself to block ice, it has other merits which offset these factors, including the manufacturing cost and its general tendency to withstand impact loading a great deal better. It would also be more convenient to hold the upper flared end of the tank if made in round form, as the tolerances would be more readily acquired with less cost. As to the top frame of the tank, this could be made in sections and welded together or could be made in any combination as preferred from a manufacturing standpoint.

The drain system in the present invention can readily be adapted to any suitable method of drainage and such a system would not be within the scope of the instant invention.

What I claim is:

1. In a refrigerator car having ice tanks and hatches therefor, said tanks having outwardly flared upper marginal portions, an upper supporting frame for the tanks extending crosswise of the car and beneath the hatches, said upper frame including inwardly converging flanges for engaging the flared marginal edges of the tanks, and a base support extending crosswise of the car, said base support including transversely extending relatively adjustable frame members, a plurality of plates supported on the frame members and engaging the bases of the tanks, and means carried by the frame for jacking the tank supported thereby and for moving the flared upper end of the tank into seating engagement with the flared portions of the frame.

2. The structure of claim 1 characterized in that filler blocks are positioned on the plate and are movable into engagement with the sides of the tanks by relative adjustment of the frame members.

3. In a refrigerator car having ice tanks and hatches therefor, said tanks having outwardly flared upper marginal portions, an upper supporting frame for the tank extending crosswise of the car and beneath the hatches, said frame member including inwardly converging flanges for engaging the flared marginal edges of the tank, and a base support extending crosswise of the car, said base support including transversely extending relatively adjustable frame members including horizontal flanges and vertical flanges, and means supported by the horizontal flanges of said angle frame members for shifting the flared upper marginal portion of the tank against the converging flanges of the upper supporting frame.

4. The structure of claim 3 characterized in that the tanks are provided at their base with embracing means having spaced ears with aligned slots, which slots receive means adjustably connecting the vertical flanges of the angle members.

5. The structure of claim 3 characterized in that filler blocks are interposed between the base of the tank and the frame members and are provided with overlapping ears provided with aligned openings and means adjusting the vertical flanges of the angle members extending through the openings in said ears.

6. The structure of claim 3 characterized in that ears project from the base of each tank, the ears having openings adapted to be aligned and receive the means adjustably connecting the vertical flanges of the angle members.

7. The structure of claim 3 characterized in that means are provided for adjustably connecting the vertical flanges of the angle members.

8. In a brine tank assembly for use in a refrigerator car, a plurality of brine tanks arranged transversely of the car structure, said tanks each having its upper marginal portion flared outwardly from its main body structure, an upper frame supported by the car and having inwardly flared portions for seating against the flared portions of said tanks, said tanks and said frame being separable, whereby said tanks can be vertically elevated to cause a seating of the inner faces of the flared portions of the tanks with the outer faces of the flared portions of the frame, and means supporting said tanks at their bottom portions after reaching their elevated position.

9. In a brine tank assembly for use in a refrigerator car, in combination, a plurality of alined tanks adapted to be arranged transversely at one end of said car, said tanks having their upper edge portions offset outwardly from their main bodies, a frame rigidly fixed to said car and extending transversely thereof, said frame including offset portions alined with the offset portions of said tanks, whereby said tanks may be moved vertically to provide an interfitting connection between the offset portions of the tanks and the offset portions of said frame, a support for the base of said tanks, and means for holding the tanks in their elevated positions with the parts interconnected.

10. In a brine tank assembly for use in a refrigerating car, in combination with a plurality of brine tanks arranged transversely within the car and having their upper marginal portions flared outwardly, an upper frame extending transversely of the car, said frame including a plurality of depending flared flanges embracing the flared flanges of each of the tanks throughout their peripheral edges, upwardly converging hoppers fixed to the upper face of said framing, each hopper discharging into a plurality of tanks, means for supporting the base of the tanks, and means for elevating the tanks with respect to their base to cause a snug engagement between the flared flanges of the tanks and associated flanges of the transverse frame.

11. In a brine tank assembly for use in a refrigerator car, in combination with a brine tank having its upper marginal portion flared outwardly from its main body structure, an upper frame extending transversely of the car and including flared portions for seating against the flared portions of the tank, and a base support for the tank, and means for vertically adjusting the tank into engagement with the upper frame structure.

12. In a refrigerator car having ice tanks and hatches therefor, the tanks having outwardly flared upper marginal portions, an upper frame for embracing the marginal portions of the tanks, said upper frame being formed with tapered marginal flanges for engaging the marginal portions of the tank, and a base support for the tanks, said base support and said upper supporting frame being connected with the car framing, and the latter including jacking means for urging the marginal portion of the tanks with the tapered flanges.

13. In a refrigerator car having ice tanks and hatches therefor, said tanks having outwardly flared upper marginal portions, a bracing frame for the tanks supported by the car structure and including downward projecting flanges for engaging the marginal portions of the tanks, a plurality of plates fixed to the upper face of the frame and projecting upwardly beneath the hatches, a base frame, and means carried by the base frame for engaging the bottom of the separate tanks for selectively adjusting the tanks in a vertical direction.

14. The structure of claim 13 characterized in that a separate hopper structure is provided at each side of the longitudinal center line of the car.

15. The structure of claim 13 characterized in that the base frame supports fibrous tank engaging elements.

16. The structure of claim 13 characterized in that the base frame comprises a pair of angle members including horizontal flanges, the angle members being relatively adjustable with respect to each other to permit clamping engagement with the adjacent sides of the tank.

17. The structure of claim 13 characterized in that the tanks are provided with a plurality of reinforcing members which are vertically spaced and rigidly fixed to the tank structure.

18. The structure of claim 13 characterized in that means are provided for hingedly connecting the tanks adjacent their bases.

19. A brine tank for use in refrigerating cars, including an elongated hollow body having outwardly flared upper marginal edges and a reinforced base, said reinforced base including projecting ears having vertical slots and a support for the bottom of the tank including a transverse rod extending through said slot.

20. The structure of claim 19 characterized in that the base frame includes a pair of spaced relatively adjustable members and elongated bolts extend through the base frame members for adjusting them with respect to each other.

21. The structure of claim 19 characterized in that the base frame includes a pair of spaced relatively adjustable members provided with ears having openings through which elongated bolts extend.

References Cited in the file of this patent

UNITED STATES PATENTS

| | | |
|---|---|---|
| 1,899,980 | O'Connor | Mar. 7, 1933 |
| 2,085,906 | Glenn | July 6, 1937 |